Patented Nov. 21, 1922.

1,436,152

UNITED STATES PATENT OFFICE.

ALEXANDER CHURCHWARD, OF NEW YORK, N. Y., ASSIGNOR TO WILSON WELDER & METALS COMPANY, INC., A CORPORATION OF NEW YORK.

ELECTRICAL-ENERGY-TRANSLATING APPARATUS.

Application filed April 28, 1919. Serial No. 293,104.

*To all whom it may concern:*

Be it known that I, ALEXANDER CHURCHWARD, a citizen of the United States, residing at New York city, county of New York, State of New York, have invented a certain new and useful Improvement in Electrical-Energy-Translating Apparatus, of which the following is a specification.

This invention relates particularly to electrical energy translating apparatus, such as employed in electrical welding, for instance arc welding; and its objects are to translate electrical energy from a main source into current suitable for various purposes such as welding, and to regulate the voltage of the output or welding current, and to efficiently ventilate the energy-translating machine. But certain features of the electro-generating means of the invention are applicable to dynamos broadly; and also, the cooling or ventilating features of the invention are applicable still more broadly to dynamos and motors: as indicated in the appended claims.

One embodiment of this invention is illustrated in the accompanying drawings in which.

Figure 1:
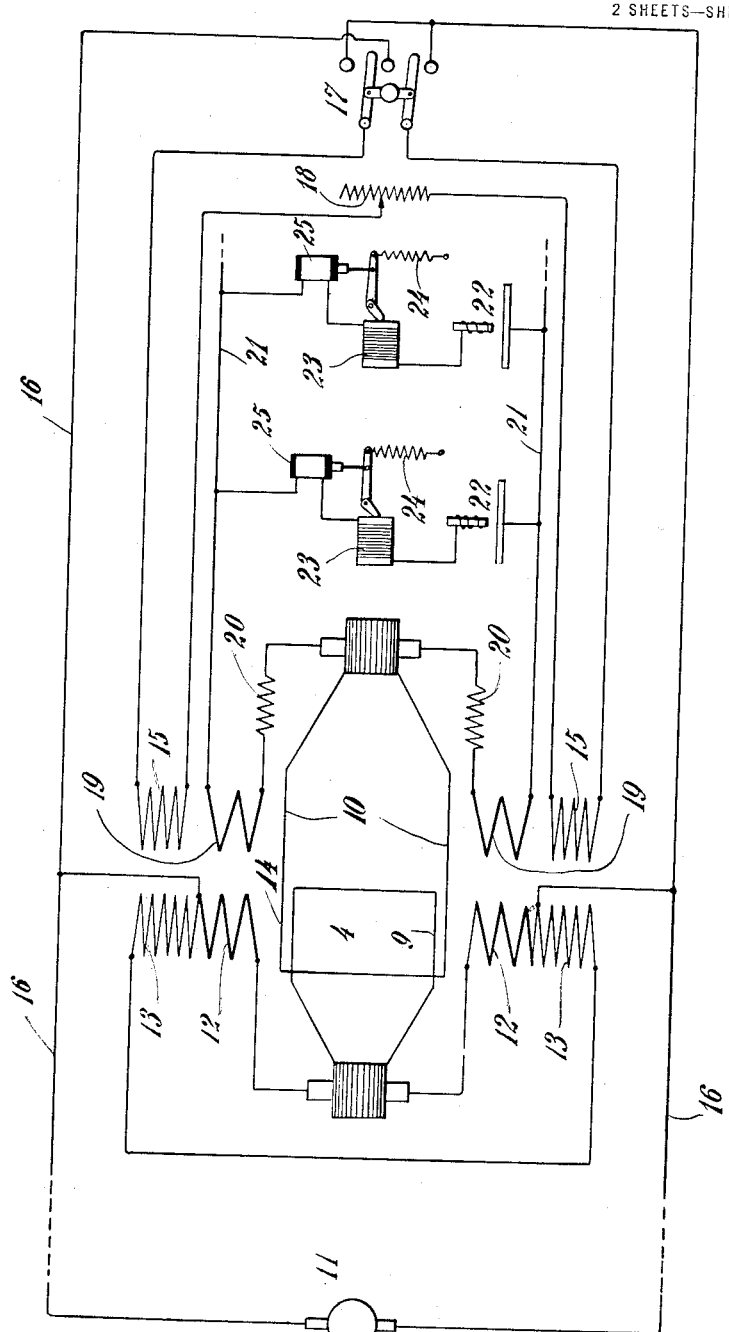
Figure 1 is a circuit diagram of the entire apparatus.

The dynamotor-booster consists in a dynamotor armature 4, and a booster armature 5, mounted on a common shaft 6, so as to rotate in separate adjacent fields 7 and 8.

The motor winding 9 of the dynamotor armature receives current from the main source 11, through the regulating series field-coils 12 wound on the field cores 7 together with the main field-coils 13 bridged in long-shunt across the armature and series field-coils. These main long-shunt field coils 13 supply the main component of magnetizing force for the field of the dynamotor armature 4, and the series coils 12 are opposed to said shunt coils in magnetizing polarity, so that the resultant dynamotor field will decrease in strength as the motor current in the motor coil 9 increases.

The generator windings 14 of the dynamotor armature are extended over the booster armature 5, to constitute booster windings 10, rotating in the booster field 8 excited mainly by the coils 15 connected across the main power line 16 through a pole-changer 17 and a regulating rheostat 18. The booster field 8 is supplementary excited by coils 19 in series with the generator winding 14, 10, and coils 20 may also be included in series therewith, and mounted on commutating interpoles coacting with the main poles of the booster field in the usual well known manner.

The output mains 21 lead to the various welding circuits to be operated independently in parallel. These individual welding circuits may be of any suitable character for utilizing the constant-potential welding current which the dynamotor-booster is designed to produce, and will generally include individual current-regulating means to compensate for variations in the electrical resistances of the several welding operations. For instance, in each welding circuit, the welding electrodes 22 may be connected in series with a pressure-variable resistance 23 subjected to compressive effort of a spring 24 variably opposed by a solenoid 25 also in series with the welding electrodes.

The pole-changing switch 17 may be set so that the booster field coils 15 will effect generation of E. M. F. in the booster winding 10 in the same direction as the E. M. F. generated in the inductors 14 of the dynamotor armature, and the degree of this boosting E. M. F. may be adjusted by the rheostat 18. Under these conditions it is found that as the demand for current from the output mains 21 increases, the rotor of the dynamotor-booster will speed up sufficiently to compensate for the drop in output voltage of the output mains 21, which voltage-drop would otherwise ensue from the increased resistance-voltage drop in the inductors of the machine.

When it is desired to obtain a lesser output voltage than can be obtained by maximum resistance of the rheostat 18 in series with the field coils 15 operating to boost the output voltage, the magnetizing polarity of these field coils may be reversed by the pole-changer 17, so that the inductors 10 on the armature 5 will generate E. M. F. opposed to the E. M. F. of the generating inductors 14 on the armature 4, whereby the output voltage will be reduced to the difference of the generated potentials rather than their sum, while of course this resultant voltage may still be regulated by the rheostat 18. In this practice the booster armature acts as a negative booster in lieu of a positive booster.

Figure 2:
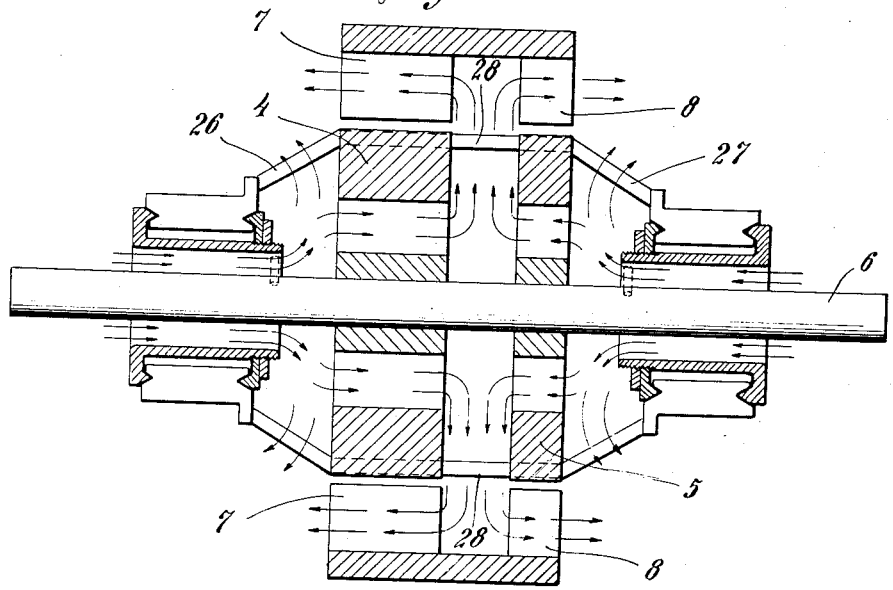
Figure 2 is a ventilation diagram of the dynamotor-booster, and shows the arrangement of the main shaft and its two armatures and their respective fields.
Figure 3:
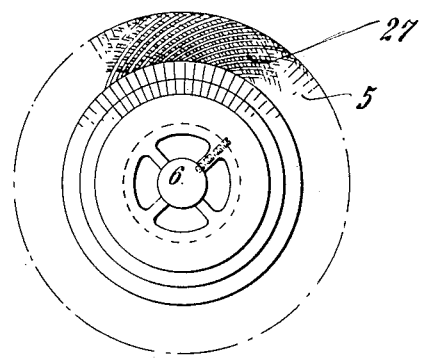
Fig. 3 is an end view of the ventilated commutator and the armature leads therewith connected.

The commutators, armatures, and fields of the dynamotor-booster are cooled by air currents induced by the centrifugal-fan effects of the armature-commutator connecting wires 26 and 27, and the inductor-connecting wires 28 between the dynamotor armature and booster armature. The armature-commutator connecting wires 26 and 27 draw the air through the spiders supporting their respective commutators, and the inductor-connecting wires 28 draw a portion of this air through the spiders supporting the dynamotor and booster armatures. Thus part of the intaken air is blown out between the armature-commutator connecting wires 26 and 27, while the remainder is blown out between the inductor-connecting wires 28 and thence through the field frame and between its field windings, all as indicated by the air-current arrows in Figure 2.

It must be understood that the invention can be practiced in other different forms of apparatus within its generic idea, and the scope of the following definitions.

I claim:

1. In a dynamo electric machine, the combination with a rotor having motor and generator windings thereon, of a stator having sets of compound field windings for the generator and motor windings on said rotor, at least one of said rotor windings being cut by the flux of only one of said sets of field windings, the series field for the generator winding being connected with the main generator leads, while the series field for the motor winding is connected with the main motor leads.

2. In a dynamo electric machine, the combination with a stator and rotor, of motor and generator windings on the rotor, compound field windings on the stator for each rotor winding, the shunt and series windings for the motor being opposed, the shunt winding of the generator having a reversing switch in the circuit thereof.

In testimony whereof, I have affixed my signature to this specification.

ALEXANDER CHURCHWARD.